Jan. 26, 1971 G. W. ZIEGLER, JR 3,559,112

SHAPE DIELECTRIC INSERTS AND METHOD OF COMPENSATION FOR ABRUPT DISCONTINUITIES IN HIGH FREQUENCY COAXIAL DEVICES

Original Filed April 24, 1967 2 Sheets-Sheet 1

United States Patent Office 3,559,112 Patented Jan. 26, 1971

3,559,112

SHAPE DIELECTRIC INSERTS AND METHOD OF COMPENSATION FOR ABRUPT DISCONTINUITIES IN HIGH FREQUENCY COAXIAL DEVICES

George William Ziegler, Jr., Carlisle, Pa., assignor to AMP Incorporated, Harrisburg, Pa.

Continuation of application Ser. No. 633,246, Apr. 24, 1967. This application Feb. 24, 1970, Ser. No. 14,742
Int. Cl. H03h *7/38;* H01p *1/00*
U.S. Cl. 333—33 4 Claims

ABSTRACT OF THE DISCLOSURE

Compensation for electric field distortion caused by abrupt diameter changes in coaxial devices is provided by controlling the effective dielectric constant K in the zone of distortion through a lamination of dielectric materials of constants $K_a$ and $K_b$ with lamina of outer diameters D′, D″, D‴ . . . and inner diameters *d′*, *d″*, *d‴* . . . based on the relationship $$K=\frac{K_a \log \frac{D}{d}}{K_a \log \frac{D}{d}-(K_a-K_b)\log \frac{D'D''D'''}{d'd''d'''}}$$

A derivation of the invention method is taught and article embodiments are presented based upon this method.

This is a continuation of application Ser. No. 633,246, filed Apr. 24, 1967, now abandoned.

BACKGROUND OF THE INVENTION

In making connections to coaxial cable it is often necessary to introduce abrupt diameter changes to one or both conductors. An abrupt change in the diameter of a coaxial cable conductor produces a field distortion which is, for practical purposes, equivalent to a shunt capacitance called a discontinuity capacitance in the publication Equivalent Circuits for Discontinuities in Transmission Lines, J. R. Whinnery and H. W. Jamieson, Proceedings of the IRE, volume XXXII, pages 98–114; February 1944. Discontinuities of this type cause electric field distortion and mismatch to the characteristic impedance of the cable. This results in standing waves and undesirable loss of power.

In my application Ser. No. 276,714 filed Apr. 30, 1963, now U.S. Pat. No. 3,350,666, issued Oct. 31, 1967, and titled Coaxial Connector there is disclosed a compensation technique for compensating for a given discontinuity capacitance by providing a further discontinuity capacitance, preferably equal to the given discontinuity capacitance, separated from the given discontinuity capacitance by a length of coaxial section of a characteristic impedance greater than the characteristic impedance of a cable. In certain designs it is inconvenient to provide a second discontinuity capacitance of the same magnitude as the given discontinuity capacitance. In many instances it means that additional machining to an intermediate diameter of one or both of the conductors of the coaxial device is required. Also, whenever the spacing between the given and provided capacitance is slight, the electromagnetic fields of the two capacitances may interact strongly and variably depending on variations in the spacing therebetween. For this reason the above-mentioned technique is not practically applicable to a single discontinuity capacitance structure.

In my application Ser. No. 403,900 filed Oct. 14, 1964, now U.S. Pat. No. 3,492,605, issued Jan. 27, 1970, and entitled High Frequency Transmission Devices and Methods of Compensation there is taught a compensation technique for a single discontinuity utilizing adjacent coaxial sections of characteristic impedances $Z1=Z2>Z0$ and $\beta 1S1=\beta 2S2$, in electrical length. In certain applications however, it is not possible to reduce the dielectric constant to achieve these relationships because of the required presence of air in the section where a reduction of dielectric constant is necessary. This requires an alteration of the conductor diameters in the section which causes an admittance mismatch.

One of the standard approaches for compensation of a single discontinuity is taught in the publication "Handbook of Design and Performance of Cable Connectors for Microwave Use," J. W. Griemsmann Bureau of Ship's Index No. NE–110718; May 1956. Use of this type of compensation has been found to work well only up to about 7 gHz. and therefore is not sufficient for devices having to operate over a range up to and past 12 gHz.

SUMMARY OF THE INVENTION

This invention relates to a method and means for compensating single discontinuity capacitances in coaxial connectors or transmission lines required to operate at a low VSWR over a broad band of signal frequencies.

It is an object of the present invention to provide a compensation technique for single discontinuity capacitances which is relatively simple to implement and easy to use and which yields a device having a low cost of fabrication. It is still another object to provide a dielectric insert having a shaped surface to compensate for discontinuity capacitances caused by abrupt changes in diameter or spacing between inner and outer conductors of a coaxial transmission path. It is still another object to provide a compensating dielectric bead having a surface configuration providing compensation for single discontinuity capacitances and at the same time having a configuration to provide center conductor support and/or gas sealing, if desired. It is yet a further object of the invention to provide a compensating dielectric insert which includes a lamination of different dielectric materials shaped to compensate for electric field distortion caused by abrupt changes in spacing between inner and outer conductors, which distortion varies as some function of distance from the site of diameter change.

The foregoing objects are attained through the method of the invention which provides a relationship of parameters affecting the degree of field distortion caused by an abrupt change in spacing between inner and outer conductors of a coaxial path permitting an exact calculation of radial lengths of different dielectric materials to provide an effective dielectric constant compensating for electric field distortion. Utilizing the method of the invention a number of dielectric insert configurations are presented in contemplation of the various physical requirements of a connector device. These requirements include applications wherein the solid dielectric material in the zone of distortion is free of the inner conductor, or free of the outer conductor, or contacting both the inner and outer conductor in a given radial section.

Figure 5:
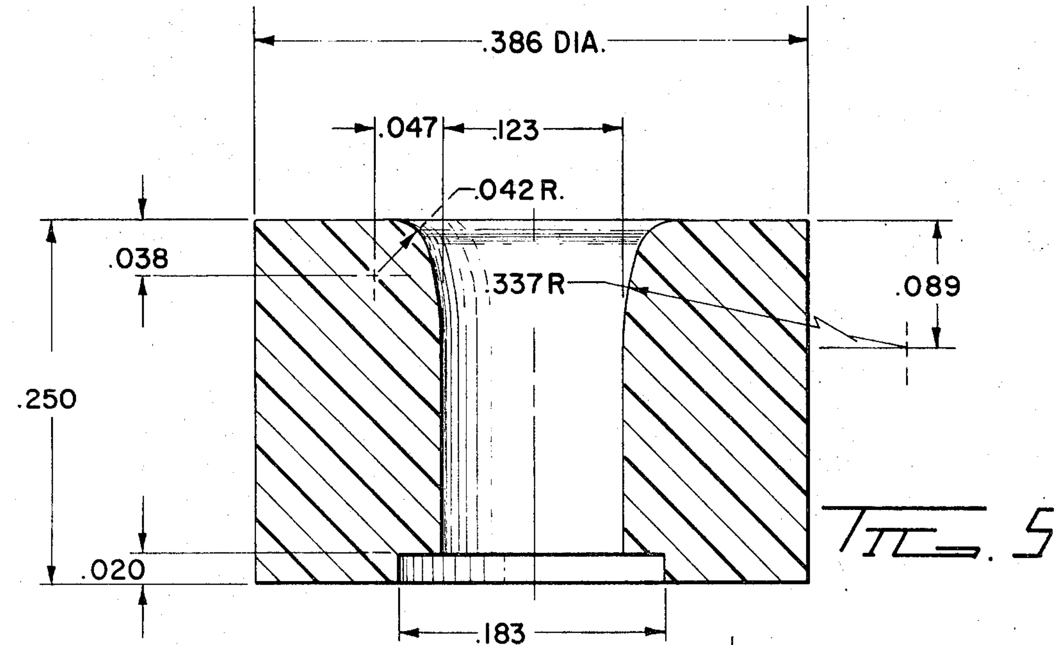

FIG. 5 is a sectional view of a dielectric insert shaped in accordance with the method of the invention but with an additional approximation of insert geometry to provide round surfaces in the zone of compensation thereof; and FIGS. 6A–6E are sectional views of different dielectric inserts compensated in accordance with the method of the invention and shaped to provide different functions with respect to the engagement of conductive surfaces.

DESCRIPTION OF THE PREFERRED EMBODIMENTS OF THE INVENTION METHOD AND MEANS

Figure 1A:
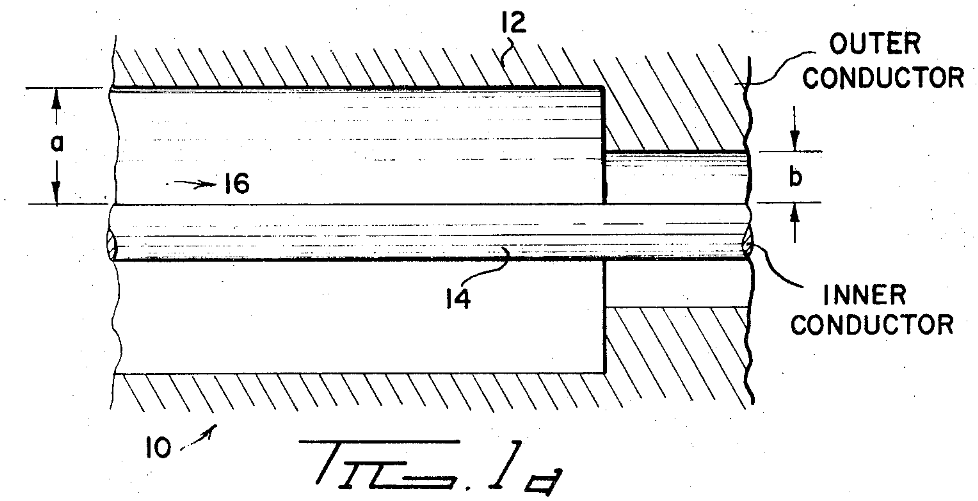
FIGS. 1A and 1B are, respectively, sectional views of coaxial signal paths having abrupt changes in spacing between inner and outer conductors which constitute single discontinuity capacitances.
Figure 1B:
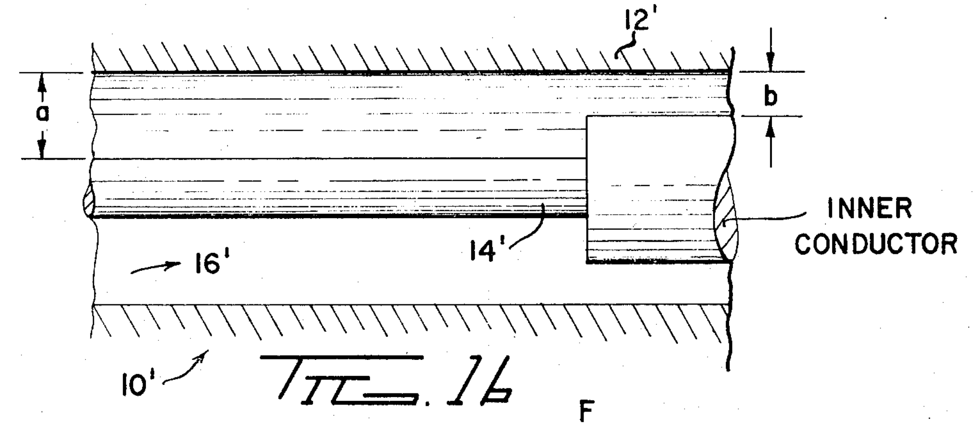
Figures 1C, 2, 3:
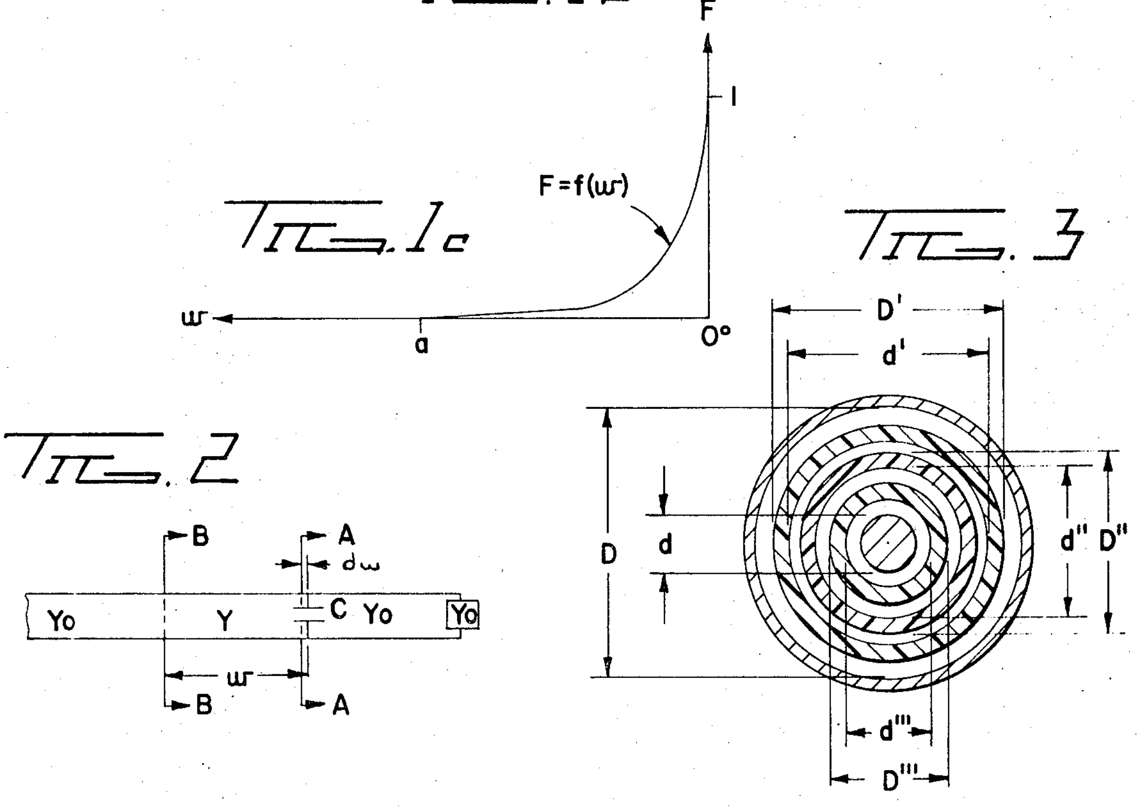
FIG. 1C is a plot showing the degree of field distortion caused by the discontinuities in FIGS. 1A and 1B as a function of distance from the discontinuity evidenced in these figures.
FIG. 2 is a diagram of the equivalent circuit for the coaxial transmission pairs shown in 1A and 1B.
FIG. 3 is a cross-sectional view depicting different laminating diameters of air and solid dielectric material used in explaining the invention method.

Referring now to FIG. 1A the device 10 may be considered to be a portion of a high frequency transmission path comprised of an outer conductor 12 and an inner conductor 14 spaced apart by a dielectric medium 16 through a spacing *a* in one portion and a lesser spacing *b* in another portion. The abrupt discontinuity shown in FIG. 1A in the outer conductor 12 is typical of that found in coaxial connectors near the point at which the connector is joined to a coaxial cable. FIG. 1B is similar to FIG. 1A but with the abrupt discontinuity formed in the inner conductor 14'. This kind of discontinuity is found in coaxial devices in the center contact at a point between a forward spring portion and a rear wire receiving barrel portion. FIG. 1C applies to both FIGS. 1A and 1B and represents the quantity of electric field distortion F at different distances *w* from the point of abrupt diameter change. As will be apparent the distortion is at a maximum at the site of the discontinuity or at the point in FIG. 1C where $w=0$ and is at a minimum at a point removed from the abrupt change in spacing where $w=a$, *a* being the maximum spacing in the coaxial sections shown in FIGS. 1A and 1B. The relationship of field distortion F to distance *w* from the discontinuity may be expressed as $F=f(w)$ which simply says that field distortion is a function of distance from the discontinuity.

From the work of Whinnery and Jamieson previously referred to, a given field distortion fraction F for various ratios $b/a$ to the fractional distance $w/a$ may be readily compiled. Table 1 below represents fractional values of F for different ratios of $b/a$ at each of 11 different ratios $w/a$:

TABLE 1

| $\frac{w}{a}$ | $\frac{F}{b/a}$ .75 | .60 | .50 | .40 | .25 |
|---|---|---|---|---|---|
| 1 | 0 | 0 | 0 | 0 | 0 |
| .9 | 0 | .003 | .005 | .007 | .009 |
| .8 | 0 | .011 | .016 | .021 | .027 |
| .7 | .008 | .026 | .035 | .043 | .052 |
| .6 | .022 | .048 | .063 | .076 | .088 |
| .5 | .053 | .085 | .104 | .120 | .137 |
| .4 | .106 | .142 | .163 | .182 | .201 |
| .3 | .203 | .230 | .246 | .265 | .291 |
| .2 | .349 | .363 | .376 | .390 | .425 |
| .1 | .593 | .593 | .593 | .597 | .632 |
| 0 | 1.000 | 1.000 | 1.000 | 1.000 | 1.000 |

The data of Table 1 may be interpreted to obtain any particular value of $b/a$ and then fitted, by the method of least squares for example, to a polynomial of the form (Equation 1)
$$F=\sum_{n=0}^{\alpha} k_n w^n = f(w)$$

and its derivative (Equation 2)
$$\frac{dF}{dw}=\sum_{n=0}^{\alpha} n k_n w^n$$

The discontinuity capacitance which may be termed C may be considered a function of field distortion and the variation of C may be expressed as (Equation 3)
$$\frac{dc}{dw}=\frac{cdF}{dw}$$

The equivalent circuit for the transmission path represented in FIG. 1C is shown in FIG. 2, the discontinuity capacitance being represented by the capacitor shown as C and the zone of diminishing field distortion being shown by the symbol *w* as extended between the site of the abrupt diameter change and some cross section B—B. A second intersecting plane A—A is included to represent the first increment of any number of increments dividing *w* into distinct segments for which calculations may be made to provide compensation. The segment A—A to B—B may be considered to have a characteristic admittance Y which varies from increment to increment. Portions of the transmission line on each side of the segment of length *w* may be considered to have a characteristic admittance $Y_o$ and the cable on one side may be considered to be terminated in a matching load of characteristic admittance $Y_o$.

Relative to FIG. 2 if we let $T=\tan, \beta w$, then (Equation 4)
$$Y_a=Y_o+jwc$$

(Equation 5)
$$Y_B=G_B+jB_B=\frac{Y(Y_a+jYT)}{Y+jY_aT}=\frac{Y[Y_o+j(wc+YT)]}{(Y-wcT)+jY_oT}=Y_o$$

to provide an admittance match at B—B. Transposing the terms of Equation 5 we get (Equation 6)
$$yo[(y-Wct)+jy_ot]=y[y_o+j(Wc+yt)]$$

The imaginary parts are (Equation 7)
$$Y_oT=Y(WC+YT)$$

The condition for a susceptance match at B—B, using Equation 5, is $$B_B=0\ T=\frac{WCY(1-T^2)}{Y_o^2-Y^2+W^2C^2}$$

when $T^2<<1$ and when $$y_o^2-y^2>>W^2C^2$$

The immediately preceding equation for T may be expressed as (Equation 8)
$$T=WCY/(Y_o^2-Y^2)$$

under the condition of usage where $dc$ and $\beta dw=\tan \beta dw$ to provide a conductance match.

From the expression for characteristic impedance we may say (Equation 9)
$$Z_o=\frac{138.05}{NK_o}\log\frac{D}{d}=Y_o^{-1}$$

and (Equation 10)
$$Z=\frac{138.05}{NK}\log\frac{D}{d}=Y^{-1}$$

Substituting from Equations 9 and 10 in Equation 8 we get (Equation 11)
$$T=\tan\beta w=\frac{wcZ_o}{\sqrt{\frac{K_o}{K}}-\sqrt{\frac{K}{K_o}}}=\tan\frac{2YYFw\sqrt{K}}{C_o}$$

$$=\tan\frac{Ww\sqrt{K}}{C_o}$$

When $w$ is small (Equation 12)

$$\tan\beta w=\beta w$$

and from Equation 11

(Equation 13)

$$K=K_o-C_o\frac{C}{W}Z_o\sqrt{K_o}$$

or, under the condition for a simultaneous susceptance match, (Equation 14)

$$K=K_o-C_oZ_o\sqrt{K_o}\frac{dc}{dw}$$

where $C_0$ is the velocity of light in free space.

This provides an expression of the effective dielectric constant in terms readily ascertainable from known quantities and from a quantity to be measured to provide a matching condition at a given increment in the zone of distortion measured by $w$.

Let us now assume that some compensating dielectric insert may be positioned in the zone of distortion at a given increment to provide a proper value for C. FIG. 3 shows in cross section a coaxial section having an outer conductor of inner diameter D and an inner conductor of outer diameter $d$. In the space between the surfaces of these conductors a laminating structure of solid dielectric material and air with any number of lamina may be provided. The three solid dielectric sleeves shown as having dimensions $D'd'$, $D''d''$ and $D'''d'''$ represent this. While air is shown it is contemplated that other dielectric mediums may be provided. In general the solid material may be considered as having a dielectric constant $K_b$ and the dielectric material therebetween may be considered as having a dielectric constant $K_a$. For a structure of the type shown in FIG. 3 the effective dielectric constant K may be expressed as (Equation 15)

$$K=\frac{K_a\log\frac{D}{d}}{K_a\log\frac{D}{d}-(K_a-K_b)\log\frac{D'D''D'''\ldots}{d'd''d'''\ldots}}$$

From Equations 14 and 15 above in conjunction with Equation 3 the ratio of diameters, inner and outer of the laminating sections may be expressed as (Equation 16)

$$\frac{D'D''D'''\ldots}{d'd''d'''\ldots}=\log^{-1}\left[\left(1-\frac{}{K_o-C_oCZ_o\sqrt{K_o}\frac{dF}{dw}}\right)\left(\frac{K_a\log D}{K_a-K_b\,d}\right)\right]$$

For practical purposes $$\frac{dF}{dw}=\frac{\Delta F}{\Delta w}$$

may be used.

Assume now that we wish to provide a compensating dielectric insert for a coaxial path like that shown in FIG. 1A for a cable having a characteristic impedance $Z_o=50$ ohms where the coaxial section has diameters of D=0.402 inch and $d$=0.120 inch; dimension of a typical section. Assume further that we desire to have the dielectric insert engaging the inner surface of the outer conductor proximate the abrupt change in diameter and engaging the outer surface of the inner diameter at some point. To provide a sliding fit we may make the outer diameter of the dielectric insert so that D'=0.400 inch. If we assume that only a single lamination of dielectric material and air is to be used we may say that the ratio of outer and inner diameters of other laminations (which will not of course exist) may be expressed as follows:

$$\frac{D''D'''D''''}{d''d'''d''''}=1$$

As one final assumption assume that the particular dielectric material being used has a dielectric constant $k_a$=2.10148 and the remaining material is that of air so that $K_b$=1.

If we now attempt to solve for the inner diameter $d'$, for the first increment based upon $\Delta w=0.1a$ or 0.0141 inch we may substitute in Equation 16 the foregoing values with the following result:

(Equation 17)

$$d'=\frac{0.400}{\log^{-1}\left[(1)-\frac{1}{(2.10148-2.85090\Delta F)(1.0251)}\right]}$$

The remaining variable ΔF is the only unknown in the relationship. Values for ΔF may be obtained for a specific ratio of $b/a$ by interpolation of Table 1. For a ratio $$\frac{b}{a}=0.553$$

and for various steps numbered $m$ begining with $m=1$ adjacent to the discontinuity of $w=0$ a table may be compiled with different values F and ΔF for each step $m$. This table is shown as Table 2 below. Different values for $d'$ calculated from Equation 17 are also shown.

TABLE 2

| $\frac{w}{a}$ | F | ΔF | $m$ | $d'$ |
|---|---|---|---|---|
| 1 | 0 | .004 | 10 | |
| .9 | .004 | .009 | 9 | |
| .8 | .013 | .018 | 8 | |
| .7 | .031 | .024 | 7 | .1206 |
| .6 | .055 | .040 | 6 | .1238 |
| .5 | .095 | .058 | 5 | .1278 |
| .4 | .153 | .085 | 4 | .1344 |
| .3 | .238 | .131 | 3 | .1480 |
| .2 | .369 | .224 | 2 | .1895 |
| 0 | 1.000 | | | .3644 |

Figure 4:
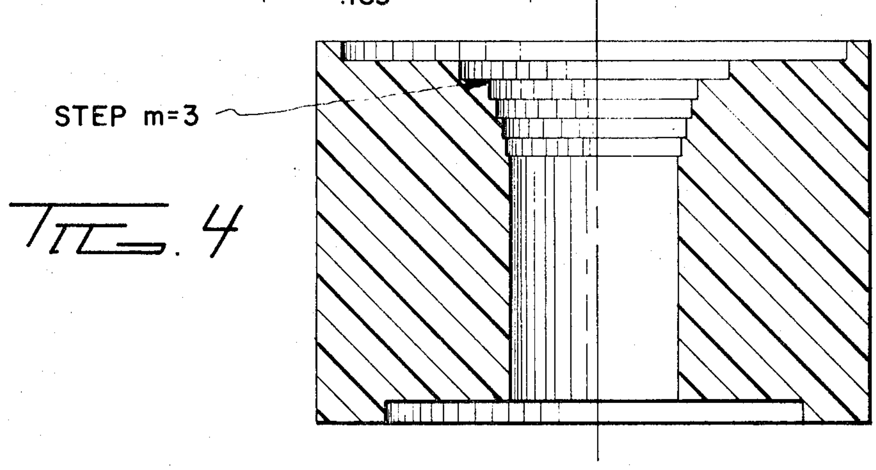
FIG. 4 is a section showing a dielectric insert made in accordance with the invention method to compensate for a single abrupt spacing change like that shown in FIG. 1A.

FIG. 4 is a plot of the resulting dielectric insert to a scale approximately ten to one.

FIG. 5 is a sectional view of an insert like that of FIG. 4 but with rounded surfaces made to average out the stepped geometry by appropriate selection of two radii in the manner indicated.

Turning now to further examples of the use of the method of the invention to generate a variety of dielectric insert geometries capable of compensating for a single discontinuity capacitance like that of FIG. 1A, reference is made to FIGS. 6A–6E. In these various examples it may be assumed that the insert material is Teflon having a dielectric constant $K_a$=2.050 and that it is desired to have some portion of the insert engaging the outer conductor and the inner conductor. For an actual connector known as an MS type connector being used with 50 ohm cable the diameters for the conductors are D=0.390 inch and $d$=0.1200 inch. The discontinuity capacitance was calculated as C=0.0156 micro-micro-farads in air. The effective dielectric constant is $K_o$=1.997445. Choosing the increment $\Delta w=0.1a$ provides step increment 0.0135 of an inch in length.

From the configuration shown in FIGS. 6A–6E it is apparent that $$\frac{D'''D''''D'''''\ldots}{d'''d''''d'''''\ldots}=1$$

and (Equation 18)

$$\frac{D'D''}{d'd''} = \log^{-1}\left[\left(1-\frac{1}{1.997445-0.963742\Delta F}\right)(0.9993914)\right]$$

Utilizing this relationship for different steps $m$ and for different vlaues ΔF determined as previously described a Table 3 as indicated below may be constructed employing Equation 18.

TABLE 3

| $m$ | ΔF | $\frac{D'D''D'''\ldots}{d'd''d'''\ldots}$ | Case (a), $d'$ | Case (b), $D'$ | Case (c), $D''$ | Case (d) $d'$ | Case (d) $D''$ | Case (e), $d'$ |
|---|---|---|---|---|---|---|---|---|
| 1 | 0.407 | 2.38121 | 0.1621 | 0.2912 | 0.2082 | 0.2760 | 0.2082 | 0.2121 |
| 2 | .228 | 2.73661 | .1410 | .3347 | .2393 | .2594 | .2249 | .1845 |
| 3 | .132 | 2.91759 | .1323 | .3568 | .2551 | .2516 | .2326 | .1731 |
| 4 | .087 | 3.00009 | .1287 | .3669 | .2624 | .2482 | .2360 | .1683 |
| 5 | .057 | 3.05427 | .1264 | .3735 | .2671 | .2461 | .2381 | .1653 |
| 6 | .038 | 3.08825 | .1250 | .3777 | .2701 | .2448 | .2395 | .1635 |
| 7 | .023 | 3.11488 | .1239 | .3810 | .2724 | .2437 | .2405 | .1621 |
| 8 | .016 | | | | | | | |
| 9 | .009 | | | | | | | |

The insert shown as 20 leaves the zone nearest the discontinuity free of solid dielectric material and requires a calculation only $d'$ as in the previous example.

Figures 6A, 6B, 6C, 6D, 6E:
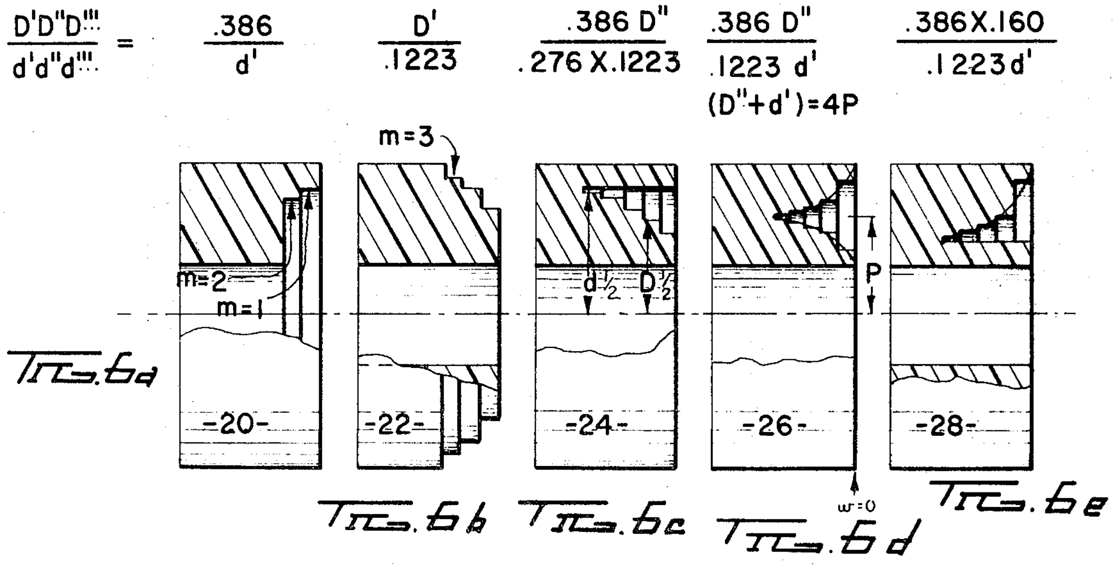

The insert shown as 22 in FIG. 6B leaves outer conductor nearest the discontinuity free of solid dielectric material and supports the center conductor nearest such zone with solid dielectric material. As can be seen, the configuration of the insert 22 requires only a determination of the parameter D'. The inserts shown as 24, 26 and 28 in FIGS. 6C–6E each provide solid dielectric material extending throughout the zone of discontinuity in engagement with the inner and outer conductors. With regard to the inserts 24 and 28 a continuous web of dielectric material of constant thickness has been provided extending along one of the conductors. This thickness may be any suitable amount. With regard to FIG. 6C the web is shown to the outside and a diameter $d'$ has been chosen equal to 0.276 for each of the increments, the remaining parameter being D'' which is found for each increment. With regard to the embodiment of FIG. 6E the web is disposed to the inside and the parameter D'' is constant for each increment with the single parameter $d'$ being solved for, for each increment.

With regard to the embodiment of FIG. 6D a center line through the insert thickness is drawn and dimensioned as 4P. From this a relationship $(D''+d')=P$ may be made. From this, Equation 18 may be manipulated to find the dimensions of dielectric material for each increment. Table 3 compiles the various parameters for each of the inserts shown in FIGS. 6A–6E as mentioned.

By the technique disclosed with respect to FIG. 5 the various steps may be integrated into a smooth curve.

It is contemplated that inserts may be made by machining in steps or by machining in a constant curve or may be made by molding depending upon the characteristics of the solid dielectric material employed. It is believed that the disclosures relative to FIGS. 6A–6E should adequately indicate the wide variety of insert configurations possible with the present invention method. Utilizing the configurations evidenced in FIGS. 6A–6E almost any similar configuration of dielectric insert can be derived to solve different physical, mechanical or material problems imposed by a given connector specification.

It is fully contemplated that the invention method and means disclosed shall be applicable to any coaxial transmission path problem and should not be limited to its use in connectors or connector devices.

While the foregoing description has emphasized field distribution data based on Whinnery and Jamieson it is contemplated that the invention method and means may be practiced using any field pattern of reasonable accuracy.

Having now disclosed the invention method and means in embodiments intended to enable a preferred practice thereof I define my invention through the appended claims.

What is claimed is:

1. In a coaxial transmission line of characteristic impedance $Z_0$ and an effective dielectric constant $K_0$ having an abrupt change in spacing between inner and outer conductors thus causing a discontinuity capacitance C and an electric field distortion F which varies along a zone extending axially away from the discontinuity capacitance for a distance W, a compensator comprising a composite dielectric medium extending along the zone between the conductors and including concentric laminae, comprised of materials having dielectric constants $K_a$ and $K_b$ respectively, adjacent ones of which are of a different said material, the inner and outer laminae being of solid material connected together and extending along the entire zone in contact with the inner and outer conductors respectively, one of said materials being laminae of respective outer diameters D', D'', D''' . . . and corresponding inner diameters $d'$, $d''$, $d'''$ . . . , incremental steps along said zone being comprised of such laminae of said one material in accordance with the relationship $$\frac{D'D''D'''\ldots}{d'd''d'''\ldots} = \log-1\left[\left(\frac{1}{K_0 C_0 C Z_0 \sqrt{K_0}\,\frac{df}{dw}}\right)\left(\frac{K_a}{K_a-K_b}\log\frac{D}{d}\right)\right]$$

where $C_0$ is the speed of light in free space and D and $d$ are the respective inner and outer diameters of the outer and inner conductors.

2. In a coaxial transmission line according to claim 1 in which the outermost laminae are of constant inner and outer diameters at a plurality of steps along the zone.

3. In a coaxial transmission line according to claim 1 in which the innermost laminae are of constant inner and outer diameters at a plurality of steps along the zone.

4. In a coaxial transmission line according to claim 1 in which a plurality of steps along the zone are provided with laminae having inner and outer diameters which vary from step to step.

References Cited

UNITED STATES PATENTS

| | | | |
|---|---|---|---|
| 3,437,960 | 4/1969 | Ziegler | 333—33X |
| 3,460,072 | 8/1969 | Ziegler | 333—33 |
| 3,492,604 | 1/1970 | Fan | 333—33 |
| 3,492,605 | 1/1970 | Ziegler | 333—33 |
| 3,496,496 | 2/1970 | Fiebel | 333—33 |

ELI LIEBERMAN, Primary Examiner

T. VEZEAU, Assistant Examiner

U.S. Cl. X.R.

333—97